US 8,286,982 B2

(12) United States Patent
Plantet et al.

(10) Patent No.: US 8,286,982 B2
(45) Date of Patent: Oct. 16, 2012

(54) BICYCLE SUSPENSION SYSTEM

(75) Inventors: Pierre-Geoffroy Plantet, Clermont Ferrand (FR); Emmanuel Antonot, Clenay (FR); Remy Gribaudo, Dijon (FR)

(73) Assignee: Cycles Lapierre, Dijon (FR)

( * ) Notice: Subject to any disclaimer, the term of this patent is extended or adjusted under 35 U.S.C. 154(b) by 94 days.

(21) Appl. No.: 12/936,198

(22) PCT Filed: Apr. 2, 2009

(86) PCT No.: PCT/EP2009/053966
§ 371 (c)(1),
(2), (4) Date: Jan. 13, 2011

(87) PCT Pub. No.: WO2009/121936
PCT Pub. Date: Oct. 8, 2009

(65) Prior Publication Data
US 2011/0095507 A1    Apr. 28, 2011

(30) Foreign Application Priority Data

Apr. 2, 2008   (FR) ...................................... 08 52161

(51) Int. Cl.
*B62K 19/00* (2006.01)
*B62K 21/02* (2006.01)
*F16F 9/512* (2006.01)

(52) U.S. Cl. ........ 280/277; 280/276; 280/279; 280/284; 188/266.1; 188/266.2; 188/282.2; 188/282.3; 188/282.4

(58) Field of Classification Search ................. 280/277, 280/276, 279, 284; 188/266.1, 266.2, 282.2, 188/282.3, 282.4
See application file for complete search history.

(56) References Cited

U.S. PATENT DOCUMENTS

| 5,921,572 | A  | * | 7/1999 | Bard et al. ..................... 280/284 |
| 5,971,116 | A  | * | 10/1999 | Franklin .................... 188/282.4 |
| 6,050,583 | A  | * | 4/2000 | Bohn ............................ 280/283 |
| 7,484,603 | B2 | * | 2/2009 | Fox ............................... 188/275 |
| 2003/0132601 | A1 | * | 7/2003 | Miyoshi ....................... 280/276 |
| 2003/0132602 | A1 | * | 7/2003 | Miyoshi ....................... 280/276 |
| 2007/0051551 | A1 | * | 3/2007 | Kobayashi .................... 180/274 |

* cited by examiner

*Primary Examiner* — Lesley D Morris
*Assistant Examiner* — Marlon Arce
(74) *Attorney, Agent, or Firm* — Blakely, Sokoloff, Taylor & Zafman

(57) ABSTRACT

The present invention relates to a suspension system for a bicycle of the type that comprises: a frame (1); a front fork (6) comprising a front damper (8); a swing arm (16) hinged to the frame (1) and a rear damper (25); and at least one shock sensor (30), said sensor (30) being connected to a monitoring unit (28) controlling the front damper (8) and/or rear damper (25) on the basis of the signal sent by said sensor (30); said system is noteworthy in that the front damper (8) and/or rear damper (25) is a variable-compression damper that has at least three positions, an open position in which compression is greatest, a closed position in which compression is zero, and a so-called medium position; and in that it has, as a minimum, means for detecting pedaling called pedaling sensors (29) connected to the monitoring unit (28) which, when pedaling is not detected by the pedaling sensor (29), sets the damper (8, 25) compression command to the open position and, when pedaling is detected by the pedaling sensor (29), sets the damper (8, 25) compression command to one of its three positions, open, closed or medium, on the basis of the shock detection signal.

10 Claims, 4 Drawing Sheets

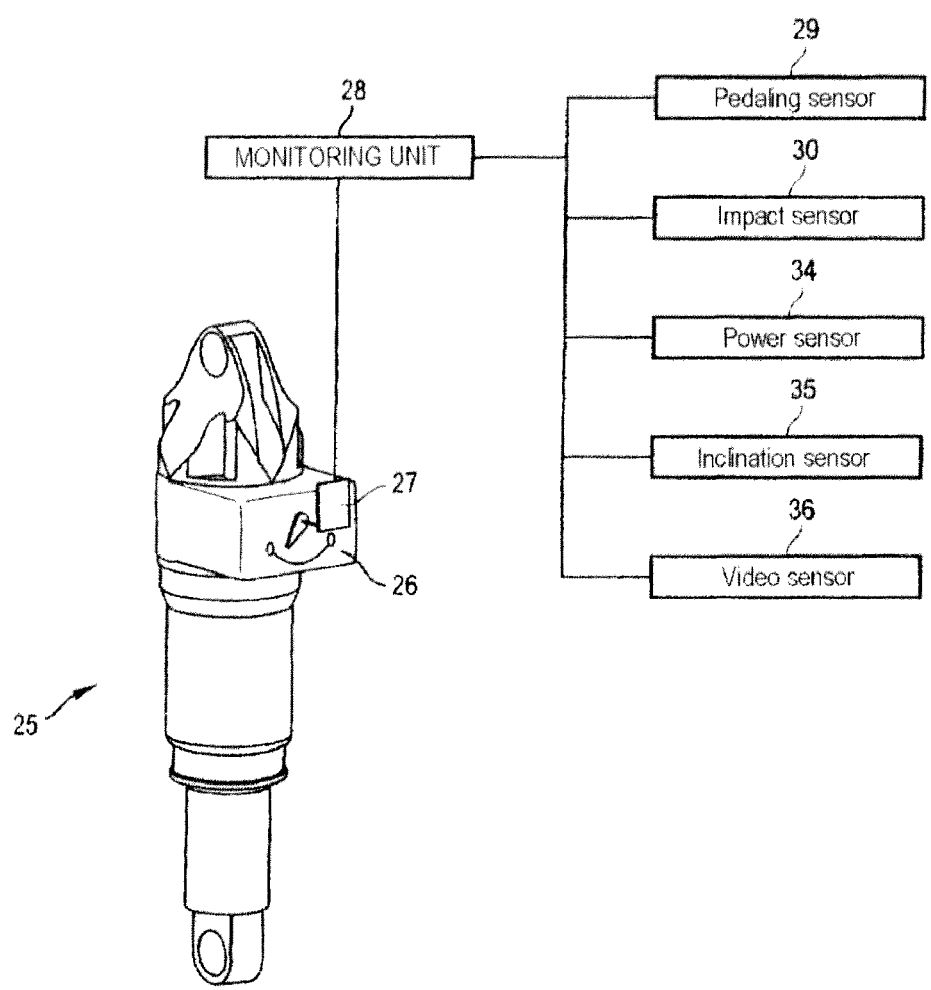

FIG. 3

Figure 1:
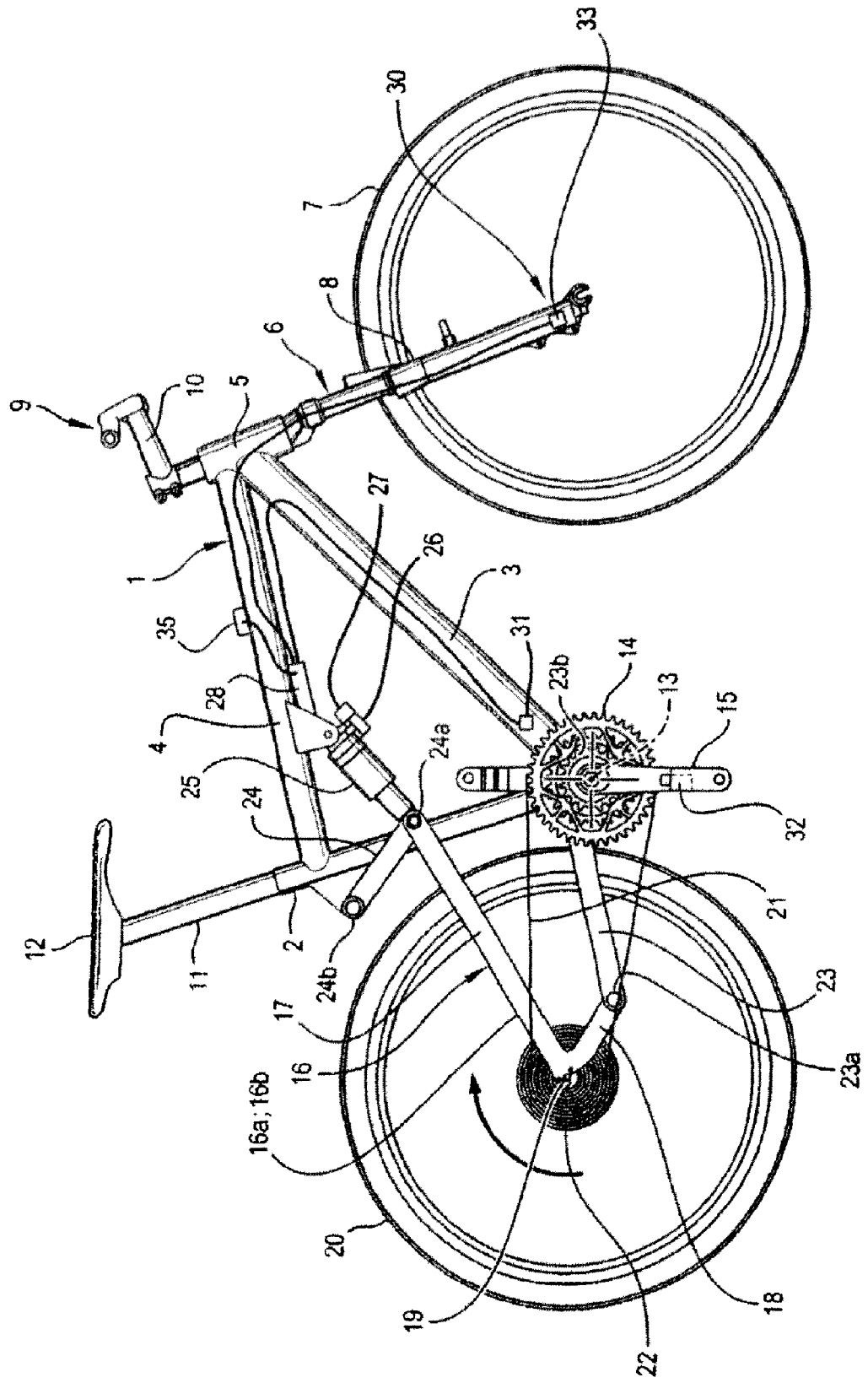

| Pedaling | Impacts | Damper(s) |
|---|---|---|
| No | No | Open |
| No | Major | Open |
| No | Medium | Open |
| Yes | No | Closed |
| Yes | Major | Open |
| Yes | Medium | Medium |

FIG. 4

| Power | Pedaling | Impacts | Damper(s) |
|---|---|---|---|
| <threshold | No | No | Open |
| <threshold | No | Major | Open |
| <threshold | No | Medium | Open |
| >threshold | Yes | No | Closed |
| >threshold | Yes | Major | Open |
| >threshold | Yes | Medium | Medium |

FIG. 5

| Power | Pedaling | Impacts | Damper(s) |
|---|---|---|---|
| P<threshold 1 | No | No | Open |
| P<threshold 1 | No | Major | Open |
| P<threshold 1 | No | Medium | Open |
| threshold 1<P<threshold 2 | Yes | No | Closed |
| threshold 1<P<threshold 2 | Yes | Major | Open |
| threshold 1<P<threshold 2 | Yes | Medium | Medium |
| P>threshold 2 | Yes | No | Closed |
| P>threshold 2 | Yes | Major | Medium |
| P>threshold 2 | Yes | Medium | Closed |

FIG. 6

| Pedaling | Impacts | Inclination | Damper(s) |
|---|---|---|---|
| No | No | Climb | Medium |
| No | Major | Climb | Medium |
| No | Medium | Climb | Medium |
| No | No | Flat | Open |
| No | Major | Flat | Open |
| No | Medium | Flat | Open |
| No | No | Descent | Medium |
| No | Major | Descent | Medium |
| No | Medium | Descent | Medium |
| Yes | No | Climb | Medium |
| Yes | Major | Climb | Medium |
| Yes | Medium | Climb | Medium |
| Yes | No | Flat | Closed |
| Yes | Major | Flat | Open |
| Yes | Medium | Flat | Medium |
| Yes | No | Descent | Medium |
| Yes | Major | Descent | Medium |
| Yes | Medium | Descent | Medium |

BICYCLE SUSPENSION SYSTEM

This is a non-provisional application claiming the benefit of International application number PCT/EP2009/053966 filed Apr. 2, 2009.

The present invention relates to a bicycle suspension system comprising at least one damper, of the type comprising at least one sensor and one monitoring unit operating the front and/or rear damper of the bicycle as a function of the signal transmitted by said sensor.

All-terrain bikes, called mountain bikes, are well known, comprising a rear suspension consisting of a swing arm articulated at the lower portion of the saddle tube interacting with a rear damper. Said swing arm pivots about a fixed shaft parallel to the axle of the drive pinions which is supported by the crankset positioned at the lower end of the frame, that is to say at the intersection of the oblique tube and of the saddle tube of the latter.

Moreover, the ends of the damper are secured to the swing arm and respectively to the horizontal tube connecting the saddle tube to the fork of the bike or to an intermediate tube extending generally from the crankset to the horizontal tube, said saddle tube being interrupted to allow the damper to pass through.

This type of rear suspension, under the action of an energetic pedaling action such as a pedaling action to start the bike off or when the cyclist adopts the "dancer" position standing on the pedals, causes an effect called the pumping effect which results in a cyclical retraction of the suspension even on perfectly level ground. This type of rear suspension therefore has the drawback of dissipating a portion of the drive torque supplied by the cyclist in the damper instead of contributing to driving the bike forward.

Also known are all-terrain bikes called mountain bikes the rear suspension of which consists of a swing arm articulated on the saddle tale and/or on the oblique tube of the frame by means of two link rods or similar, said swing arm or at least one of the link rods interacting with a damper. Said swing arm pivots about a mobile virtual pivot point, also called instantaneous center of rotation, which corresponds to the intersection of the straight lines passing through the respective axes of the link rods.

This is the case, not ably, of the American patent application US 2002/0109332, for example, which describes such a rear suspension of a bike. The instantaneous center moves into the lower anterior quadrant and moves from front to rear and from top to bottom when the swing arm moves upward when an obstacle such as a bump, for example, is ridden over.

Such a rear suspension with instantaneous center of rotation, also called virtual pivot point, has the drawback of producing a pumping effect.

In order to remedy this drawback, a rear suspension of a vehicle has already been devised that does not produce a pumping effect. This is the case notably of the French patent application FR 2 898 577 filed by the applicant which describes a rear suspension comprising a rear swing arm supporting the hub of the rear wheel and articulated by at least two articulation means on a frame supporting a crankset. The instantaneous center of rotation is situated close to the top tight strand of the chain in a position of static equilibrium and moves to the inside of a horizontal strip such that said instantaneous center moves horizontally when the swing arm moves upward when an obstacle is ridden over. This trajectory of the instantaneous center of rotation produces an anti-pumping effect by creating a righting moment tending to bring the swing arm back into its position of static equilibrium during pedaling.

However, whatever the type of rear suspension, that is to say an arm pivoting about a fixed point or pivoting about a mobile virtual pivot point, the conventional dampers have several drawbacks. A first drawback is that the conventional dampers are configured with a damping law in which the speed of retraction is usually fixed. Most conventional dampers comprise two positions, an open position in which the speed of retraction is maximal and a closed position in which the speed of retraction is zero, that is to say that the damper behaves like a rigid part. These various positions make it possible to adapt the properties of the damper as a function of the nature of the terrain.

Moreover, the conventional dampers are not capable of differentiating between the movements of the wheel due to running over an obstacle and the movements caused by the transfers of weight of the cyclist on the frame of the bike.

In order to remedy these drawbacks, suspension systems have already been devised comprising at least one sensor connected to a monitoring unit and operating the rear damper, and optionally the front damper of the front fork, as a function of the signal transmitted by said sensor, said sensor usually measuring an acceleration in order to detect a wheel encountering an obstacle.

This is the case, notably, with the European patent application EP 1 241 087, the American U.S. Pat. No. 6,149,174, DE 10 2005 025811, US 2001/030408 or else international patent application WO 99/06231.

All these rear suspension systems operated by the monitoring unit nevertheless have the drawback that they do not control the properties of the damper as a function notably of the pedaling of the cyclist.

One of the objects of the invention is therefore to remedy these drawbacks by proposing a bicycle suspension system of the type comprising at least one rear damper and/or front damper of simple design, not very costly, making it possible to adapt the properties of the damper as a function of the pedaling of the cyclist.

Accordingly, and according to the invention, a bicycle suspension system is proposed of the type comprising a chassis called a frame, a front fork supporting the axle of the hub of a front steerable wheel and comprising a first damper called the front damper, a swing arm articulated on the frame, supporting the axle of the hub of a rear drive wheel and a damper the ends of which are secured respectively to the frame and to the swing arm, the drive torque being transmitted to the drive wheel by a chain extending between a drive pinion secured to the frame and a driven pinion secured to the axle of the hub of the drive wheel and at least one sensor called an impact sensor capable of determining the running over of an obstacle by the steerable wheel and/or the drive wheel, said sensor being connected to a monitoring unit operating the front damper and/or rear damper as a function of the signal transmitted by said sensor; said system is noteworthy in that the front damper and/or rear damper is a variable-compression damper comprising at least three positions, an open position in which the compression is maximal, a closed position in which the compression is zero and a medium position, and in that it comprises at least means for detecting pedaling, called pedaling sensors connected to the monitoring unit which, when no pedaling is detected by the pedaling sensor, sets the compression control of the damper in the open position and, when pedaling is detected by the pedaling sensor, sets the compression control of the damper in one of its three positions, open, closed or medium, as a function of the impact-detection signal.

Said monitoring unit sets the compression control of the damper in the closed position when, on the one hand, pedaling is detected by the pedaling sensor and, on the other hand, no impact is detected.

Moreover, the monitoring unit sets the compression control of the damper in an intermediate position when, on the one hand, pedaling is detected by the pedaling sensor and, on the other hand, an impact is detected by the impact sensor.

In addition, the monitoring unit sets the compression control of the damper in its open position when, on the one hand, pedaling is detected by the pedaling sensor and, on the other hand, an impact of great intensity is detected by the impact sensor.

Secondarily, the system according to the invention comprises means for determining the energy of the detected impact.

Advantageously, the monitoring unit then sets the speed of retraction of the damper as a function of the energy level of the impact detected by the sensor.

Said pedaling detection means consist of at least one reed switch secured to the frame and of at least one permanent magnet secured to at least one crankarm.

According to a variant embodiment, said pedaling detection means consist of at least one inductive magnetic sensor secured to the frame and of at least one permanent magnet secured to at least one crankarm.

According to another variant embodiment, said pedaling detection means consist of means for measuring the pedaling power which means being connected to the monitoring unit which sets the compression control as a function of the measured power.

Advantageously, the system according to the invention also comprises means for measuring the inclination of said bicycle which means being connected to the monitoring unit which sets the compression control as a function of the measured inclination.

Other advantages and features will better emerge from the following description of several variant embodiments, given as nonlimiting examples, of the bicycle suspension system according to the invention, based on the appended drawings in which:

FIG. 1 is a partial side view of a bicycle fitted with the suspension system according to the invention, FIG. 2 is a schematic representation of the diagram illustrating the suspension system according to the invention, FIG. 3 is a truth table of the algorithm of the monitoring unit of the suspension system of the invention, FIG. 4 is a truth table of a variant embodiment of the algorithm of the monitoring unit of the suspension system according to the invention, FIG. 5 is a truth table of a second variant embodiment of the algorithm of the monitoring unit of the suspension system according to the invention, FIG. 6 is a truth table of a final variant embodiment of the algorithm of the monitoring unit of the suspension system according to the invention.

The suspension system according to the invention will be described below for an all-terrain bike, called a mountain bike, with a virtual pivot point; however, it is quite evident that the suspension system could be used for any type of bike comprising a rear suspension, such as a mountain bike with a fixed pivot point, and optionally a front suspension, without however departing from the context of the invention.

With reference to FIG. 1, the mountain bike comprises a triangular chassis 12 called a frame consisting of a saddle tube 2 that is generally vertical, an oblique tube 3 assembled by being welded to the lower end of the saddle tube 2 and a horizontal tube 4 of which the ends are assembled by being welded to the upper end of the saddle tube 2 and respectively a fork tube 5 that is generally vertical, the oblique tube 3 moreover being secured to said fork tube 5 also by welding. This fork tube 5 accommodates a fork 6 of the telescopic type supporting at its lower end the axle of the hub of the front wheel 7 of the mountain bike. The telescopic fork 6 usually comprises a damper called a front damper 8. Handlebars 9 are conventionally secured to the distal end of a stem 10 secured to the upper end of the fork 6 in order to steer the mountain bike.

It goes without saying that the frame 1 can have any shape such as a reclining V or a reclining L shape for example without however departing from the context of the invention.

The saddle tube 2 is capable of accommodating a saddle stem 11 comprising at its upper end a saddle 12 on which the cyclist takes position.

It goes without saying that the various tubes, saddle tube 2, oblique tube 3, horizontal tube 4, and fork tube 5, of the frame 1, can be assembled by any appropriate means well known to those skilled in the art such as by bonding and or by interlocking for example.

The lower end of said saddle tube 2, that is to say the intersection of the oblique tube 3 and of the saddle tube 2, comprises a crankset 13 conventionally supporting the axle of the drive pinions 14 commonly called chainrings the axes of rotation of which are coaxial, pedals 15 being secured to the axle of the drive pinions 14 on either side of the frame 1 of the mountain bike.

Said mountain bike also comprises a swing arm 16 consisting of two assemblies 16a, 16b, in the shape of a V extending on either side of the mid-plane of the frame 1. Said assemblies 16a, 16b are connected by one or more crossmembers not shown in FIG. 1. Each assembly 16a, 16b of the swing arm 16 consists of an oblique tube 17 called the seat stay and a lower tube 18 connected in twos by welds. The intersection of the seat stay 17 and the lower tube 18 supports the axle of the hub 19 of the rear wheel 20.

In a conventional manner, said rear wheel 20 is rotated by a transmission chain 21 extending between the drive pinions 14 of the crankset 13 and driven pinions 22 supported by the axle of the hub 19 of the rear drive wheel 20 when the cyclist pedals.

It goes without saying that the swing arm 16 can have any shape such as a triangular shape or generally rectilinear shape without departing from the context of the invention.

Moreover, said swing arm 16 is secured to the frame 1 by two articulation means 23 and 24.

The first articulation means 23 consists of a lower link rod 23 of which the rotation axles 23a and 23b positioned at the free ends of said link rod 23 are respectively articulated at the free end of the lower tube 18 of the swing arm 16 to the saddle tube 2 close to the crankset 13.

The second articulation means 24 consists of an upper link rod 24 of which the rotation axles 24a, 24b positioned at the ends of said upper link rod are respectively articulated at the anterior free end of the seat stay 17 of the swing arm 16 and on the saddle tube 2, beneath the horizontal tube 3 of the frame 1.

It goes without saying that the articulation means 23, 24, could be substituted by other equivalent articulation means such as an eccentric, a flexible strip or similar elements, without however departing from the context of the invention.

The mountain bike also comprises a rear damper 25 the free ends of which are secured respectively to the horizontal tube 3 and to the anterior free end of the seat stay 7 of the swing arm 16 or of the upper link rod 24.

Note that, as a function of the architecture of the frame 1 and of the swing arm 16, the ends of the rear damper 25 can be secured to a transfer link rod and respectively to any one of the tubes of the frame 1.

Said rear damper 25 consists of a variable-compression damper comprising at least three positions, an open position in which the compression is maximal, a closed position in which the compression is zero, and a position called medium.

This type of variable-compression damper 25 comprises a compression valve 26 as described in American application U.S. Pat. No. 6,135,434 for example. The suspension system according to the invention also comprises means for actuating the compression valve 26 consisting, for example, of a servomotor operated by a monitoring unit 28. This monitoring unit 28 comprises an algorithm which determines the compression control of the rear damper 25 and/or front damper 9 as a function of a signal of the presence of pedaling and optionally of an impact-detection signal, said signals being determined by means 29 for the detection of the presence of pedaling and optionally means 30 for detecting impacts.

These means 29 for detecting pedaling consist, with reference to FIGS. 1 and 2, of a reed switch 31 secured to the frame 1, more precisely secured to the saddle tube 2 or to the oblique tube 3 close to the crankset 13, and at least one permanent magnet 32 secured to one or both crankarms 15. This type of detector for the presence of pedaling has a good sensitivity of approximately 2 mT and a sufficiently low magnetic overload. Moreover, this type of detector is particularly of low cost.

According to a variant embodiment of the suspension system according to the invention, the detector of pedaling presence with a reed switch can advantageously be substituted by an inductive magnetic detector 31 consisting in an inductive magnetic sensor secured to the frame 1, close to the crankset 13, and a permanent magnet 32 secured to one of the crankarms. This type of detector has the advantage of exhibiting a vibration resistance better than the detectors of the reed switch type.

The means 30 for detecting impacts consist, for example, of at least one accelerometer 33 secured to the lower free end of the fork 6.

According to another variant embodiment of the suspension system according to the invention, the means for detecting impacts may consist of a microswitch furnished with a tongue close to which a weight is secured. This weight is calibrated so that it causes the contact to close for a determined minimum intensity of impact. Advantageously, the detection means may consist of two or three switches respectively furnished with a tongue at the end of which a different weight is secured. Thus a first microswitch will make it possible to detect the minor impacts and the second microswitch will make it possible to detect the major impacts. Therefore, with reference to FIG. 3, the algorithm of the monitoring unit determines the open, closed or medium position of the damper as a function of the signals of presence of pedaling and of impact detection.

When no pedaling is detected, the monitoring unit 28 operates the damper 25 to the open position regardless of whether minor impacts, major impacts or no impact has/have been detected by the impact-detection means 30. When pedaling is detected and no impact is detected, the monitoring unit 28 operates the damper 25 to the closed position thus preventing any compression of the damper 25 and preventing the occurrence of the pumping phenomenon due to pedaling. When pedaling is detected and a major impact is detected, the monitoring unit 28 operates the damper 25 to the open position in order to allow maximum absorption of the impact by said damper 25.

Finally, when pedaling is detected and an impact of medium intensity has been detected, the monitoring unit 28 operates the damper 25 to its medium position.

It will be observed that the intensity of an impact is proportional to the measured acceleration. Moreover, an impact of medium intensity and an impact of high intensity correspond to values of acceleration that those skilled in the art can easily determine as a function of the use of the mountain bike in particular.

According to another variant embodiment of the suspension system according to the invention, with reference to FIG. 2, the pedaling detection means described above can be substituted or supplemented by means 34 for detecting the power developed by the cyclist when pedaling. These power-detection means 34 may consist for example of a power sensor as marketed by POLAR®, for example. Said power-detection means 34 is connected to the monitoring unit 28 which receives a signal proportional to the measured power.

With reference to FIG. 4, the algorithm of the monitoring unit 28 then determines whether the received signal is below or above a threshold value in order to determine whether pedaling is present or not. For example, if the power measured by the power-measuring means is below a threshold of 100 watts, for example, the monitoring unit 28 determines that there is no pedaling. On the other hand, if the measured power is above the threshold of 100 watts, the monitoring unit 28 determines that there is pedaling. Then, in the same manner as above, when no pedaling is detected, the monitoring unit 28 operates the damper to the open position whether or not an impact has been detected. Moreover, when pedaling is detected, the damper 25 is operated to the open position when a major impact is detected, to the closed position when no impact is detected and to the medium position when an impact of medium intensity has been detected.

Advantageously, with reference to FIG. 5, the monitoring unit 28 can compare the value of the measured power relative to two thresholds, a first threshold of 100 watts and a second threshold of 200 watts for example. The monitoring unit 26 then determines an absence of pedaling, if the measured power is below the first threshold of 100 watts. When no pedaling is detected, the monitoring unit 28 operates the damper 25 in the same manner as above to the open position whether or not impacts have been detected. When the value of the measured power is between the first threshold of 100 watts and the second threshold of 200 watts, the monitoring unit 28 determines the presence of pedaling and operates the damper 25 to the closed position when no impact is detected, to the open position when a major impact is detected and to the medium position when an impact of medium intensity has been detected. Finally, when the measured power is higher than the value of the second threshold of 200 watts, the monitoring unit 28 operates the damper 25 to the closed position when no impact is detected, to the medium position when a major impact is detected and to the closed position when an impact of medium intensity is detected.

According to another variant embodiment, the suspension system according to the invention, with reference to FIGS. 1 and 2, may also advantageously comprise at least one sensor 35 measuring the inclination of the bike, said sensor 35 being connected to the monitoring unit 28. The monitoring unit 28 then operates the damper 25 as a function of the signal of presence of pedaling, of the signal of detection of impacts and of the signal corresponding to the inclination of the bike. An example of a truth table of the algorithm of the monitoring unit 28 is shown in FIG. 6.

Moreover, the suspension system according to the invention may also comprise means for determining the frequency of the impacts so that the monitoring unit 28 then operates the damper as a function of the signal of presence of pedaling, of the signal of detection of impacts (intensity of impacts) and of the signal of frequency of the impacts.

Secondarily, with reference to FIG. 2, the suspension system according to the invention may comprise a video sensor 36, such as a CMOS sensor connected to the monitoring unit 28 which comprises an algorithm for processing the mages transmitted by the video sensor so as to determine the presence or absence of an obstacle before the steerable wheel 7 encounters said obstacle. Advantageously, the algorithm will also be able to determine, prior to the impact, the intensity of the impact so that said monitoring unit 28 can operate the damper 25 in consequence as described above for example.

Moreover, the suspension system according to the invention can comprise means for detecting the range of movement of the front fork, not shown in the figures, connected to the monitoring unit 28, which, as a function of the measured range of movement and of the speed of movement of the bike, said speed being measured by a speed sensor well known to those skilled in the art, operates the compression control of the rear damper 25 and/or of the front damper 6.

It is very clear that, for reasons of simplification, the various sensors 30 of the system according to the invention are connected to the monitoring unit 28 by wire means; however, it goes without saying that the various sensors may transmit their respective signals to the monitoring unit 28 by any wireless transmission means well known to those skilled in the art such as, for example, Bluetooth connections or similar, without however departing from the context of the invention.

Moreover, it is very clear that the front damper 25 and/or rear damper 6 consist(s) of a hydraulic damper which could be substituted by any type of variable compression damper, such as an electromagnetic damper for example.

Finally, it goes without saying that the suspension system according to the invention can be adapted to all types of vehicles comprising a chassis, a swing arm supporting the axle of the hub of at least one drive wheel, articulated to the chassis about a fixed point or about a virtual pivot point, and a damper of which the ends are secured respectively to the chassis and to the swing arm and that the examples that have just been given are only particular illustrations which are in no way limiting with respect to the fields of application of the invention.

The invention claimed is:

1. A bicycle suspension system comprising a chassis called a frame,
    a front fork supporting the axle of the hub of a front steerable wheel,
    a first damper called the front damper,
    a swing arm articulated on the frame, supporting the axle of the hub of a rear drive wheel and a damper the ends of which are secured respectively to the frame and to the swing arm,
    wherein the drive torque is transmitted to the drive wheel by a chain extending between a drive pinion secured to the frame and a driven pinion secured to the axle of the hub of the drive wheel,
    at least one sensor called an impact sensor capable of determining the running over of an obstacle by the steerable wheel and/or the drive wheel, said sensor being connected to a monitoring unit operating the front damper and/or rear damper as a function of the signal transmitted by said sensor,
    wherein the front damper and/or rear damper is a variable-compression damper comprising at least three positions, an open position in which the compression is maximal, a closed position in which the compression is zero and a medium position,
    at least means for detecting pedaling, called pedaling sensors connected to the monitoring unit which, when no pedaling is detected by the pedaling sensor, sets the compression control of the damper in the open position and, when pedaling is detected by the pedaling sensor, sets the compression control of the damper in one of its three positions, open, closed or medium, as a function of the impact-detection signal.

2. The bicycle suspension system as claimed in claim 1, wherein the monitoring unit sets the compression control of the damper in the closed position when, on the one hand, pedaling is detected by the pedaling sensor and, on the other hand, no impact is detected.

3. The bicycle suspension system as claimed in claim 1, wherein the monitoring unit sets the compression control of the damper in an intermediate position called medium when, on the one hand, pedaling is detected by the pedaling sensor and, on the other hand, an impact is detected by the impact sensor.

4. The bicycle suspension system as claimed in claim 1, wherein the monitoring unit sets the compression control of the damper in its open position when, on the one hand, pedaling is detected by the pedaling sensor and, on the other hand, an impact of great intensity is detected by the impact sensor.

5. The bicycle suspension system as claimed in claim 1, wherein it further comprises means for determining the energy of the detected impact.

6. The bicycle suspension system as claimed in claim 4, wherein the monitoring unit sets the speed of retraction of the damper as a function of the energy level of the impact detected by the impact sensor.

7. The bicycle suspension system as claimed in claim 1, wherein the pedaling detection means consist of at least one reed switch secured to the frame and of at least one permanent magnet secured to at least one crankarm of a crankset.

8. The bicycle suspension system as claimed in claim 1, wherein the pedaling detection means consist of at least one inductive magnetic sensor secured to the frame and of at least one permanent magnet secured to at least one crankarm of a crankset.

9. The bicycle suspension system as claimed in claim 1, wherein the pedaling detection means consist of means for measuring the pedaling power which means being connected to the monitoring unit which sets the compression control of the damper as a function of the measured power.

10. The bicycle suspension system as claimed in claim 1, wherein it further comprises means for measuring the inclination of said bicycle which means being connected to the monitoring unit which sets the compression control of the damper as a function of the measured inclination.

* * * * *